United States Patent [19]

Michel

[11] Patent Number: 4,969,232
[45] Date of Patent: Nov. 13, 1990

[54] ADJUSTABLE CASTER WHEEL ASSEMBLY

[75] Inventor: James J. Michel, Agoura, Calif.

[73] Assignee: Everest & Jennings, Inc., Camarillo, Calif.

[21] Appl. No.: 395,738

[22] Filed: Aug. 3, 1989

[51] Int. Cl.⁵ ............................................. B60B 33/00
[52] U.S. Cl. ........................................ 16/35 D; 16/38; 16/DIG. 27; 280/250.1
[58] Field of Search ............... 16/19, 35 D, 38, 43, 16/DIG. 22, DIG. 27, DIG. 37, DIG. 39, 31 A; 280/96.1, 250.1

[56] References Cited

U.S. PATENT DOCUMENTS

| | | |
|---|---|---|
| 1,223,877 | 4/1917 | Hilfrank ..................... 16/DIG. 39 |
| 1,373,648 | 4/1921 | Bradford ............................ 16/19 |
| 1,919,666 | 7/1933 | Patterson ............................ 16/38 |
| 1,922,099 | 8/1933 | Kilian ................................. 16/38 |
| 2,155,827 | 4/1939 | Herold ................................ 16/38 |
| 2,325,895 | 8/1943 | Wallace .......................... 16/35 D |
| 2,529,769 | 11/1950 | Hallewell ........................ 16/35 D |
| 2,582,420 | 1/1952 | Ellis . |
| 2,963,732 | 12/1960 | Kramcsak, Jr. et al. . |
| 3,433,500 | 3/1969 | Christensen . |
| 3,547,459 | 12/1970 | Lapham . |
| 3,924,292 | 12/1975 | Christensen . |
| 4,074,407 | 2/1978 | Christensen . |
| 4,097,954 | 7/1978 | Christensen . |
| 4,176,879 | 12/1979 | Rodaway . |
| 4,186,905 | 2/1980 | Brudy . |
| 4,280,246 | 7/1981 | Christensen . |
| 4,360,213 | 11/1982 | Rudwick et al. .................. 16/35 D |
| 4,432,116 | 2/1984 | Schultz . |
| 4,770,467 | 9/1988 | Zinn . |
| 4,805,260 | 2/1989 | Tooth ................................. 16/38 |

FOREIGN PATENT DOCUMENTS

| | | | |
|---|---|---|---|
| 62514 | 10/1982 | European Pat. Off. ........... 16/35 D |
| 2613780 | 10/1977 | Fed. Rep. of Germany .......... 16/38 |
| 238663 | 11/1945 | Switzerland ........................ 16/38 |
| 1009817 | 11/1965 | United Kingdom .................. 16/19 |

Primary Examiner—Richard K. Seidel
Assistant Examiner—Edward A. Brown
Attorney, Agent, or Firm—Kelly Bauersfeld & Lowry

[57] ABSTRACT

An improved caster wheel assembly for a wheelchair or the like includes adjustable bearing components for variably resisting swivel motion of a caster wheel to prevent undesired wheel flutter. The caster wheel assembly includes a wheel fork unit having a rotatable caster wheel, and a housing sleeve adapted for mounting onto the frame of a wheelchair or other castered device. An upstanding swivel post on the wheel fork unit is supported within the housing sleeve by the bearing components for rotation about an upright swivel axis. The bearing components include an outer bushing mounted on the housing sleeve, and having a conical bearing surface for axially engaging a mating bearing surface of a longitudinally split inner bushing. A nut threaded onto the swivel post urges the inner bushing axially against the outer bushing with a selected adjustable axial load to resist rotation of the swivel post, and thereby resist undesired rotational flutter of the swivel post and the associated caster wheel.

18 Claims, 1 Drawing Sheet

ADJUSTABLE CASTER WHEEL ASSEMBLY

BACKGROUND OF THE INVENTION

This invention relates generally to improvements in caster wheel assemblies of the type used with wheelchairs and other castered devices. More particularly, this invention relates to an improved caster wheel assembly having adjustable bearing means for variably resisting caster wheel swivel to prevent undesired flutter or shimmy.

Caster wheel assemblies in general are well known in the art for use with many different types of rolling devices. As one example, such caster wheel assemblies are commonly employed as the front wheels in a typical wheelchair. Each caster wheel assembly typically includes a wheel fork unit which rotatably supports a relatively small diameter caster wheel, and which further includes a generally upright swivel post captured by appropriate bearings for rotation about a swivel axis within a fixed cylindrical housing. The fixed housing is adapted in turn for mounting onto frame components of the wheelchair or other castered device. Such caster wheel assemblies beneficially provide a high degree of turning maneuverability.

One major problem encountered with conventional caster wheel assemblies relates to uncontrolled vibrational shimmy or flutter of the caster wheel during rolling movement of the castered device. More specifically, uneven wheel wear and/or nonuniform loading of the castered device can cause one or more caster wheels to experience rapid oscillatory rotation or flutter about the swivel axis. Such oscillatory flutter results in noisy caster wheel operation and imparts a vibrational shimmy to the frame of the castered vehicle. Moreover, during caster wheel flutter, increased effort is normally required to move the castered vehicle. These factors are particularly disadvantageous in a wheelchair environment since they result in a noisy and uncomfortable chair ride, and further require increased manual effort or increased power consumption to drive the wheelchair.

In the past, a variety of caster wheel assemblies have been designed with additional components intended to resist swivel rotation, and thereby resist undesired flutter during operation. In general terms, such antiflutter devices have utilized springs or other resilient structures for physically resisting caster wheel swivel. See, for example, U.S. Pat. Nos. 3,924,292; 4,097,954; 2,963,732 and 4,280,246. Other caster arrangements have included hydraulic components for resisting caster wheel swivel. See, for example, U.S. Pat. No. 4,432,116. However, these swivel resistance arrangements inherently require increased manual or power drive input to move the caster device through turning maneuvers, wherein this increased power requirment can be particularly undesirable in some environments, such as a wheelchair environment. Relatively simple means for variably adjusting the swivel resistance to a minimum force sufficient to prevent caster flutter have not been provided.

There exists, therefore, a significant need for improvements in caster wheel assemblies, particularly with respect to providing adjustable means for variably resisting caster wheel swivel, thereby preventing undesired caster flutter with a minimum force to minimize the power input needed to operate the castered device. The present invention fulfills these needs and provides further related advantages.

SUMMARY OF THE INVENTION

In accordance with the invention, an improved caster wheel assembly is provided with adjustable bearing components for variably resisting caster wheel swivel to prevent wheel flutter or shimmy. The bearing components include axially engaged bearing surfaces for frictionally resisting caster wheel swivel. Adjustment means are provided for variably urging the bearing surfaces against each other with a selected axial force load. Accordingly, the swivel resistance can be adjusted to a minimum level sufficient to prevent caster flutter.

In the preferred form, the caster wheel assembly comprises a wheel fork unit rotatably supporting a relatively small diameter caster wheel. The wheel fork unit includes a generally upstanding swivel post which extends coaxially within a housing sleeve adapted for fixed mounting onto the frame of wheelchair or other castered device. The bearing components rotatably support the swivel post within the housing sleeve, thereby accommodating rotation of the wheel fork unit about an upright swivel axis extending coaxially through the housing sleeve.

The bearing components include an outer bushing carried by the housing sleeve, in combination with an inner bushing carried about the swivel post. In the preferred form, the inner and outer bushing define axially engaged conical bearing surfaces. The adjustment means comprises an adjustment nut threaded onto the swivel post for urging the inner bushing axially against the outer bushing with a selected axially force load. The inner bushing is longitudinally split, such that the axial loading between the bushings wedges the inner bushing axially and radially against the outer bushing. This wedging action resists rotation of the inner bushing relative to the housing sleeve, wherein this resistance to rotation is transmitted via the adjustment nut to the swivel post. A load washer and resilient compression ring are conveniently interposed between the nut and the inner bushing to insure substantially uniform circumferential loading of the inner bushing in the axial direction.

With the adjustable caster wheel assembly of the present invention, the specific force load resisting caster flutter can be increased quickly and easily by advancement of the adjustment nut along the threaded swivel post. In a wheelchair or the like, the adjustment nut can be set for a relatively minimal force load sufficient to prevent wheel flutter without undue restriction of swivel motion. During operation, the adjustment nut can be adjusted as needed to a relatively minimum level sufficient to prevent caster wheel flutter.

Other features and advantages of the present invention will become more apparent in the following detailed description taken in conjunction with the accompanying drawings which illustrate, by way of example, the principals of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
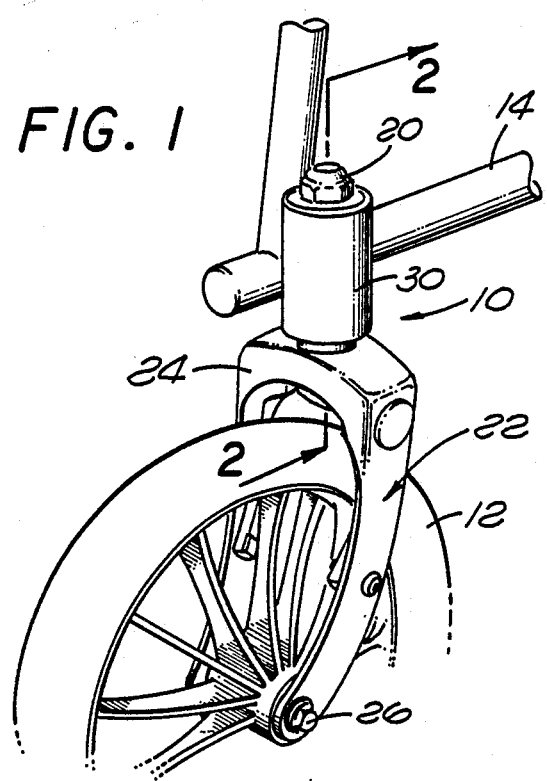
FIG. 1 is a fragmented perspective view illustrating an adjustable caster wheel assembly embodying the novel features of the invention.

As shown in the exemplary drawings, an improved castor wheel assembly referred to generally by the reference numeral 10 is provided to prevent undesired flutter or shimmy of a caster wheel 12 during normal operation of a castered vehicle, such as a wheelchair 14 or the like as depicted in FIG. 1. The caster wheel assembly 10 includes interengaged bearing components 16 and 18 (FIGS. 2 and 3) which are adjustably urged against each other by appropriate setting of an adjustment nut 20 to apply a variably selected resistance force preventing wheel flutter relative to an upright swivel axis.

The caster wheel assembly 10 of the present invention is particularly designed for use with castered devices such as wheelchairs which may be subjected to variable loading and/or variable terrain conditions resulting in sporadic wheel flutter. The caster wheel assembly 10 is adjustable quickly and easily to increase and decrease frictional resistance to flutter forces, thereby permitting the resistance force to be set at a substantially minimum setting to prevent wheel flutter without unduly restraining wheel swivel during normal operation. In a wheelchair environment, this arrangement beneficially minimizes the manual or powered input required to turn the wheelchair while preventing wheel flutter which can otherwise result in a noisy and/or uncomfortable chair ride. It will be understood, however, that the improved caster wheel assembly 10 of the present invention can be used advantageously for other types of castered vehicles such as shopping carts, and other types of rolling tables, carts and chairs.

Figure 2:
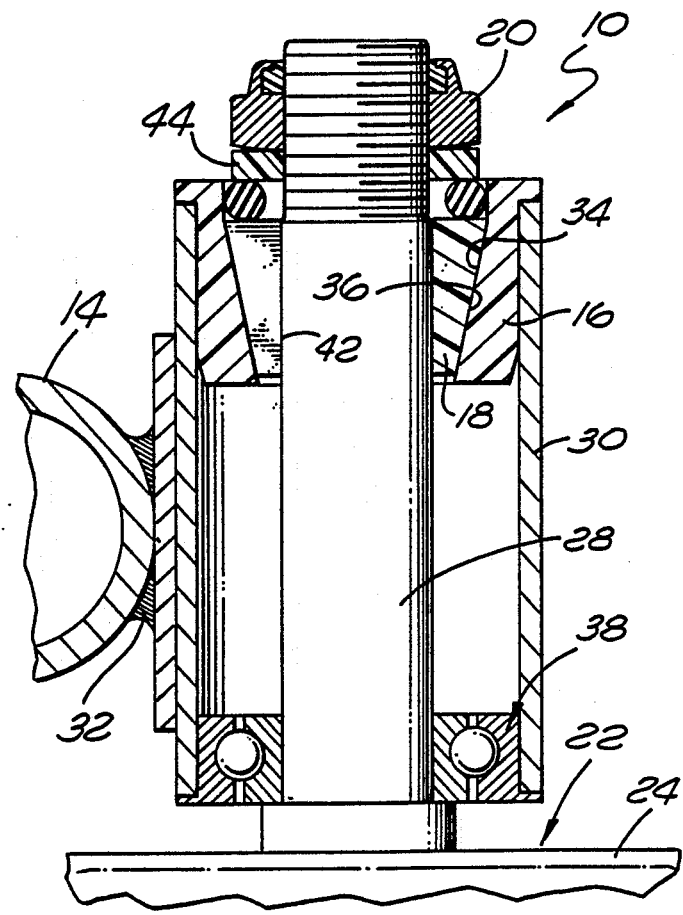
FIG. 2 is an enlarged vertical sectional view taken generally on the line 2—2 FIG. 1.
Figure 3:
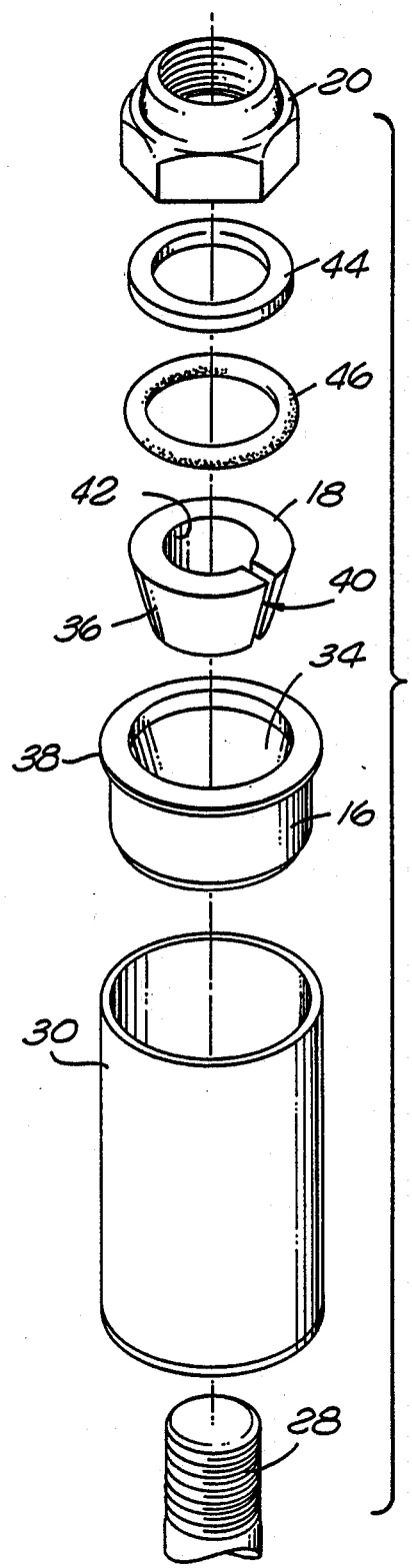
FIG. 3 is an exploded perspective view illustrating assembly of components forming the adjustable caster wheel assembly.

As shown in FIGS. 1-3, the caster wheel assembly 10 comprises a wheel fork unit 22 defined by a relatively conventional yoke 24 having an axle 26 rotatably supporting the caster wheel 12. A generally upright swivel post 28 projects upwardly from the yoke 24 along a vertical axis which is typically perpendicular to the wheel axle 26 and offset to one side thereof. During operation, the swivel post 28 defines an upright swivel axis for pivoting or swivel motion of the yoke 24 during a wheelchair turning manuever, as will be described.

The swivel post 28 extends upwardly within a generally cylindrical housing sleeve 30 adapted for secure attachment in any suitable manner, such as by a weld 32, to the frame 14 of the wheelchair or the like. The swivel post 28 is coaxially supported within the housing sleeve 30 by bearing members, including the bearing components 16 and 18. Importantly, these bearing components 16 and 18 include axially engaging bearing surfaces 34 and 36 which are urged against each other with a force load directly attributable to the setting of the adjustment nut 20 to variably resist vibrational flutter or shimmy of the caster wheel 12 relative to the upright swivel axis.

More specifically, a ball bearing unit 38 or the like is shown in FIG. 2 for rotatably supporting a lower end of the swivel post 28 relative to a lower end of the housing sleeve 30. The bearing components 16 and 18 are positioned in turn at the upper end of the housing sleeve 30 to support and engage an upper end region of the swivel post. The bearing component 16 comprises a cylindrical bushing of plastic or the like seated within the upper end of the sleeve 30 to position a bearing lip 38 upon the axially upper end of the housing sleeve. The bearing surface 34 of this outer bushing is shaped as a conical surface presented radially inwardly and axially upwardly with respect to the swivel post 28. The second bearing component 18 comprises a smaller inner bushing of plastic or the like to define the bearing surface 36 of axially downwardly and outwardly presented conical shape.

The inner bushing 18 further includes a central passage 42 formed therein to permit mounting of the bushing 18 about the upper end of the swivel post 28. In this position, the inner bushing is generally concentrically disposed within the outer bushing 16 such that the conical bearing surfaces 34 and 36 are axially engaged. A longitudinal split 40 formed in the inner bushing 18 permits radial expansion or contraction thereof to wedge outwardly against the outer bushing 16 with a variably set force. This wedging action results in frictional resistance tending to prevent rotation of the inner bushing 18 relative to the outer bushing 16.

More particularly, the inner bushing 18 is initially positioned about the swivel post 28 at an axial location for minimal bearing load against the bearing surface 34 of the outer bushing 16. The axial position of the inner bushing 18 is maintained by the adjustment nut 20 threaded onto a threaded upper end of the swivel post 28. A standard lock nut is desirably used for the adjustment nut, and a load washer 44 of nylon plastic or the like is normally interposed between the nut 20 and an axially upper end face of the inner bushing. In the preferred form, a resilient compression ring 46 is additionally interposed between the load washer 44 and the inner bushing 18.

This compression ring 46 may be formed as a standard elastommeric O-ring or the like to assist in preventing entry of moisture or grit or other undersired contaminants away from the bearing surfaces 34 and 36. The ring 46 additionally provides a relatively high rate spring to compensate for any gradual wear at the bearing surfaces or in other components of the assembly. Moreover, the coefficient of friction between the compression ring 46 and the washer 44 is normally sufficiently large such that swivel rotation of the post 28 results in relative movement between the harder components defined by the nut 20 and the washer 44, thereby avoiding undue wear of the ring 46.

Importantly, when there is little or no axial load urging the bushing bearing surfaces 34 and 36 against each other, the bushings 16 and 18 cooperatively define a journal bearing component for rotatably supporting and guiding the upper end of the swivel post 28 relative to the swivel axis.

In the event that undesired wheel flutter or shimmy is encountered during normal operation, the adjustment nut 20 can be threadably advanced on the swivel post 28. Such adjustment of the nut 20 bears upon the washer 44 which carries the compression ring 46 into axial engagement with the inner bushing 18 with an increasing axial force load. More specifically, the compression ring 46 is displaced downwardly against the inner bushing to pinch or wedge the inner bushing tightly against the bearing surface 34 of the outer bushing 16. The resultant axial force load acting between the bushings is increased to a degree sufficient to prevent wheel flutter attributable to unstable forces acting rotationally about the swivel axis. In particular, the axial loading frictionally resists rotation of the inner bushing 18 within the outer bushing 16, and thus frictional resistance to rotation is transmitted via the compression ring 46, load washer 44 and the nut 20 to resist rotation of the swivel post 28 about the swivel axis. However, this force adjustment is advantageously maintained at a minimum force level to avoid unwarranted restriction of caster wheel swivel motion during normal turning maneuvers. Moreover, if subsequent operating conditions permit a smaller force load to effectively prohibit wheel flutter, the adjustment nut 20 can be threadably retracted to the appropriate setting. Upon threaded retraction of the adjustment nut 20, the inner bushing 18 tends to unload axially with respect to the outer bushing 16 as a result of the natural resiliency of the bushing materials and/or upon encountering turning forces during subsequent operation of the castered vehicle.

The caster wheel assembly 10 of the present invention thus provides a relatively simple yet highly effective device for applying an adjustable or variable force to frictionally resist undesired wheel flutter about a caster swivel axis. The invention permits the resistance force to be set substantially at a minimum level to avoid unnecessary restrictions upon free wheel turning operation.

A variety of modifications and improvements to the improved caster wheel assembly of the present invention will be apparent to those skilled in the art. Accordingly, no limitation on the invention is intended by way of the foregoing description and accompanying drawings, except as set forth in the appended claims.

What is claimed is:

1. An adjustable caster wheel assembly comprising:
   a wheel fork unit including a rotatable caster wheel and a generally upright swivel post;
   housing sleeve means adapted for attachment to a castered device; and
   bearing means for rotatably supporting said swivel post within said housing sleeve means, said bearing means including adjustment means for variably selecting a frictional resistance force to resist swivel post rotation within said housing sleeve means to correspondingly prevent flutter of said caster wheel during normal operation, said bearing means including an outer bearing component carried by said housing sleeve means and an inner bearing component carried about said swivel post, said outer and inner bearing components defining axially and radially engageable bearing surfaces, said adjustable means including means for forcing said outer and inner bearing components against each other with a variably selected axial and radial force load.

2. The adjustable caster wheel assembly of claim 1 wherein said wheel fork unit comprises a wheel yoke, and an axle carried by said wheel yoke for supporting said caster wheel for rotation about a first axis, said swivel post extending from said wheel yoke along a second axis disposed generally perpendicular to said first axis.

3. The adjustable caster wheel assembly of claim 1 wherein said bearing surfaces of said outer and inner bearing components are conical bearing surfaces.

4. The adjustable caster wheel assembly of claim 3 wherein said outer and inner bearing components comprise outer and inner bushings, and wherein said inner bushing is longtiudinally split.

5. The adjustable caster wheel assembly of claim 3 wherein said outer and inner bushings are formed from a plastic material.

6. The adjustable caster wheel assembly of claim 4 wherein said swivel post includes a threaded distal end, and wherein said adjustment means comprises a nut threaded onto said swivel post for axially displacing said inner bushing relative to said outer bushing.

7. The adjustable caster wheel assembly of claim 6 wherein said adjustment nut is a lock nut.

8. The adjustable caster wheel assembly of claim 6 wherein said adjustment means further comprises a load washer interposed axially between said nut and said inner bushing.

9. The adjustable caster wheel assembly of claim 8 wherein said adjustment means further comprises a resilient compression ring interposed axially between said load washer and said inner bushing.

10. The adjustable caster wheel assembly of claim 1 in combination with the castered device comprising a wheelchair.

11. An adjustable caster wheel assembly, comprising:
    a wheel fork yoke;
    a caster wheel carried by said fork yoke for rotation about a substantially horizontal axis;
    a swivel post projecting upwardly from said wheel fork yoke along a substantially vertical axis;
    a housing sleeve adapted for attachment to a caster device, said swivel post being receivable within said housing sleeve;
    bearing means rotatably supporting said swivel post within said housing sleeve for rotation about said vertical axis comprising a swivel axis for the caster wheel assembly, said bearing means including an outer bearing component carried by said housing sleeve and an inner bearing component carried about said swivel post, said outer and inner bearing components defining axially and radially engageable bearing surfaces; and
    adjustment means for resisting rotation of said swivel post about said swivel axis with a variable resistance force sufficient to prevent caster wheel flutter, said adjustment means including means for forcing said outer and inner bearing components against each other with a variably selected force load.

12. The adjustable caster wheel assembly of claim 11 wherein said bearing means comprises upper and lower bearing members within said housing sleeve, said adjustment means comprising means for variably adjusting the rotational resistance imposed by at least one of said bearing members.

13. The adjustable caster wheel assembly of claim 11 wherein said bearing surfaces of said outer and inner bearing components are conical bearing surfaces.

14. The adjustable caster wheel assembly of claim 13 wherein said outer and inner bearing components comprise outer and inner bushings, and wherein said inner bushing is longtiudinally split.

15. The adjustable caster wheel assembly of claim 14 wherein said swivel post includes a threaded distal end, and wherein said adjustment means comprises a nut threaded onto said swivel post for axially displacing said inner bushing toward said outer bushing.

16. The adjustable caster wheel assembly of claim 15 wherein said adjustment means further comprises a load washer interposed axially between said nut and said inner bushing.

17. The adjustable caster wheel assembly of claim 16 wherein said adjustment means further comprises a resilient compression ring interposed axially between said load washer and said inner bushing.

18. The adjustable caster wheel assembly of claim 17 in combination with the castered device comprising a wheelchair.

* * * * *